United States Patent Office.

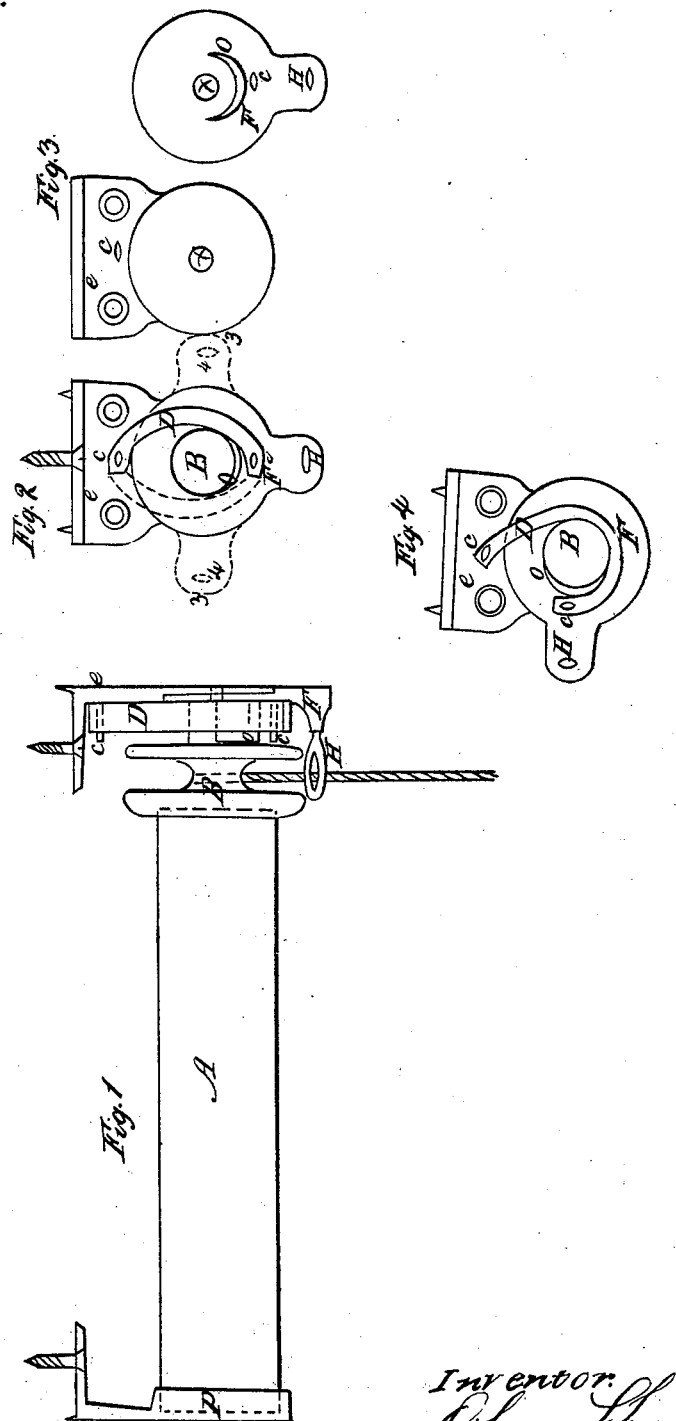

JOHN SHOREY AND FREEMAN H. BUTLER, OF LOWELL, MASSACHUSETTS, ASSIGNORS TO SAID SHOREY AND JOHN GRIFFITH, OF SAME PLACE.

Letters Patent No. 98,307, dated December 28, 1869; antedated December 18, 1869.

IMPROVED CURTAIN-FIXTURE.

The Schedule referred to in these Letters Patent and making part of the same.

*To all whom it may concern:*

Be it known that we, JOHN SHOREY and FREEMAN H. BUTLER, both of the city of Lowell, county of Middlesex, and State of Massachusetts, have invented a new and improved Combination Friction and Balance Curtain-Fixture; and we do hereby declare the following to be a full, clear, and exact description of the same, reference being had to the accompanying drawings, and the letters of reference marked thereon.

Figure 1 shows the fixture complete.

A represents the roller, to which the curtain is attached, one end turning freely in the bracket P; the other end is glued into the pulley B; the opposite end of the pulley B rests and turns in the crescent-shaped bearing o.

An end view of bearing o is seen in Figures 2, 3, and 4.

c c are two pins or studs, projecting from the bracket e F.

D is a strip of leather, or other suitable material, with a hole punched in each end, so as to slip on the pins c c.

e, fig. 3, is the upper, and F, the lower parts of the combination bracket. They are riveted together at the holes x x, so that F may be turned to the right or left. (See dotted lines 3 3, fig. 2.)

H is an eye or staple, for the cord to pass through, to prevent it getting off the pulley B.

Fig. 3 shows the two parts of the bracket e F separately, before riveting them together.

Fig. 4 shows the lower part of the bracket F turned, so as to bring the strap D down on the bearing of the pulley B, thus giving any required amount of friction to balance a light or heavy curtain. The fixture can be changed to a left-hand fixture, by changing the strap D to the other side of the crescent-shaped bearing o, and turning the eye H to the other side, as shown by dotted lines in fig. 2. It can be used as a balance-fixture, by taking off the strap D, and applying a weighted tassel to the cord.

The advantages of the fixture are, the friction can be regulated to a light or heavy curtain, by turning the movable part F of the bracket up or down, thus tightening or loosening the strap D on the bearing of the pulley B. Throw away the strap D, and use it for a balance-fixture.

Claim.

What we claim as our invention, in improvement in curtain-fixtures, and wish to secure by Letters Patent, is—

The friction-plates e and F, connected with the brackets, strap D, eye or staple H, and pulley B, arranged as shown and described.

JOHN SHOREY.
FREEMAN H. BUTLER.

Witnesses:
JULIAN ABBOT,
CHAS. E. CARTER.